(12) United States Patent
Tsoukatos et al.

(10) Patent No.: US 10,290,319 B1
(45) Date of Patent: May 14, 2019

(54) HIGH RPM HARD DISK DRIVE TESTING

(71) Applicant: Seagate Technology LLC, Cupertino, CA (US)

(72) Inventors: Antonia Tsoukatos, Maple Grove, MN (US); Tim Rausch, Farmington, MN (US); Mehmet Fatih Erden, St. Louis Park, MN (US); Benjamin W Parish, Prior Lake, MN (US); Prasanna Manja Ramakrishna, Aurora, CO (US); Morovat Bryan Tayefeh, Longmont, CO (US); Sai Sian Hon, Singapore (SG); ChengYi Guo, Singapore (SG); Teck Khoon Lim, Singapore (SG); Song Wee Teo, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/058,819

(22) Filed: Aug. 8, 2018

(51) Int. Cl.
*G11B 27/36* (2006.01)
*G11B 20/18* (2006.01)
*G11B 5/596* (2006.01)
*G11B 19/04* (2006.01)

(52) U.S. Cl.
CPC ...... *G11B 20/1816* (2013.01); *G11B 5/59633* (2013.01); *G11B 19/048* (2013.01); *G11B 27/36* (2013.01); *G11B 2220/2516* (2013.01)

(58) Field of Classification Search
CPC ..... G11B 27/36; G11B 20/18; G11B 33/1446; G11B 33/08; G11B 20/1816; G11B 20/182; G11B 20/1889; G11B 19/048; G11B 19/04
USPC ..... 360/25, 31, 53, 97.12, 97.19; 369/47.14, 369/53.1, 53.12, 53.15, 53.42
See application file for complete search history.

(56) References Cited

U.S. PATENT DOCUMENTS

| | | | |
|---|---|---|---|
| 6,304,986 B1 | 10/2001 | Ma et al. | |
| 7,646,556 B1 | 1/2010 | Kose et al. | |
| 7,653,847 B1 | 1/2010 | Liikanen et al. | |
| 7,768,736 B2 | 8/2010 | Belmont et al. | |
| 8,599,507 B2 | 12/2013 | Sanvido et al. | |
| 8,964,320 B1 | 2/2015 | Hu et al. | |
| 9,142,246 B1 | 9/2015 | Trantham et al. | |
| 9,484,059 B2 | 11/2016 | Lim et al. | |
| 9,552,846 B1 * | 1/2017 | Lim | G11B 27/36 |

* cited by examiner

*Primary Examiner* — Nabil Z Hindi
(74) *Attorney, Agent, or Firm* — Faegre Baker Daniels LLP (57) ABSTRACT

A method for performing a flaw scan test on a hard disk drive is disclosed. The hard disk drive includes a magnetic recording medium and spindle motor associated with a predetermined rated speed. The method includes writing a test pattern to the magnetic recording medium while operating the spindle motor at a speed greater than the predetermined rated speed. The method also includes reading the test pattern at the greater speed and detecting flaws in response to reading the test pattern.

20 Claims, 6 Drawing Sheets

| FLAW_TYPE | HEAD | ZONE | TRACK | FLAW_LOC_HRPM | WEDGE_SIZE_LRPM | WEDGE_SIZE_HRPM | NORM_FLAW_LOC |
|---|---|---|---|---|---|---|---|
| TA | 1 | 6 | 37711 | 868308 | 3383 | 2536 | 1158315 |
| TA | 1 | 6 | 37712 | 868308 | | | 1158315 |
| TA | 1 | 6 | 37713 | 868308 | | | 1158315 |
| TA | 1 | 6 | 37714 | 868306 | | | 1158312 |
| TA | 1 | 6 | 37715 | 868308 | | | 1158315 |

HIGH RPM HARD DISK DRIVE TESTING

TECHNICAL FIELD

The present disclosure relates to manufacturing hard disk drives.

BACKGROUND

During manufacture of hard disk drives, hard disk drives are subjected to various tests while hard disk drive motors are rotated at a set speed.

SUMMARY

In certain embodiments, a method for testing a hard disk drive is disclosed. The hard disk drive includes a motor set to rotate at a predetermined rated speed. The method includes subjecting the hard disk drive to a plurality of tests during which the motor operates at a first speed. The first speed is the predetermined rated speed. The method also includes subjecting the hard disk drive to a high-rpm test during at least a portion of which the motor operates at a second speed greater than the predetermined rated speed.

In certain embodiments, a method for performing a flaw scan test on a hard disk drive is disclosed. The hard disk drive includes a magnetic recording medium and spindle motor associated with a predetermined rated speed. The method includes writing a test pattern to the magnetic recording medium while operating the spindle motor at a speed greater than the predetermined rated speed. The method also includes reading the test pattern at the greater speed and detecting flaws in response to reading the test pattern.

In certain embodiments, a testing system for scanning for flaws on magnetic recording media of hard disk drives is disclosed. Each hard disk drive includes a spindle motor set to rotate at a predetermined rated speed. The testing system includes a plurality of testing slots for receiving the hard disk drives and a controller configured to cause the testing system to implement a routine. The routine includes operating the spindle motor of at least some of the hard disk drives in the plurality of testing slots at the predetermined rated speed during a plurality of tests. The routine also includes operating the spindle motor of at least some hard disk drives in the plurality of testing slots at a speed greater than the predetermined rated speed during a flaw scan test.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

To meet the increasing demand for digital storage, hard disk drives continue to increase in areal density. Increased areal density typically involves—among other things—increasing the number of tracks on a hard disk drive's magnetic recording media. Increasing the number of tracks involves reducing the size of the tracks to allow for more tracks in a given area, and decreased track sizes lead to smaller tolerances for error. As a result, the time and cost for manufacturing hard disk drives continues to increase. For example, increasing the number of tracks on magnetic recording media increases the time required to scan for and identify potential flaws along the tracks. In another example, increasing the number of tracks increases the time required for establishing what are referred to as servo parameters. Certain embodiments of the present disclosure relate to improved approaches for identifying flaws on magnetic recording media used in hard disk drives.

Figure 1:
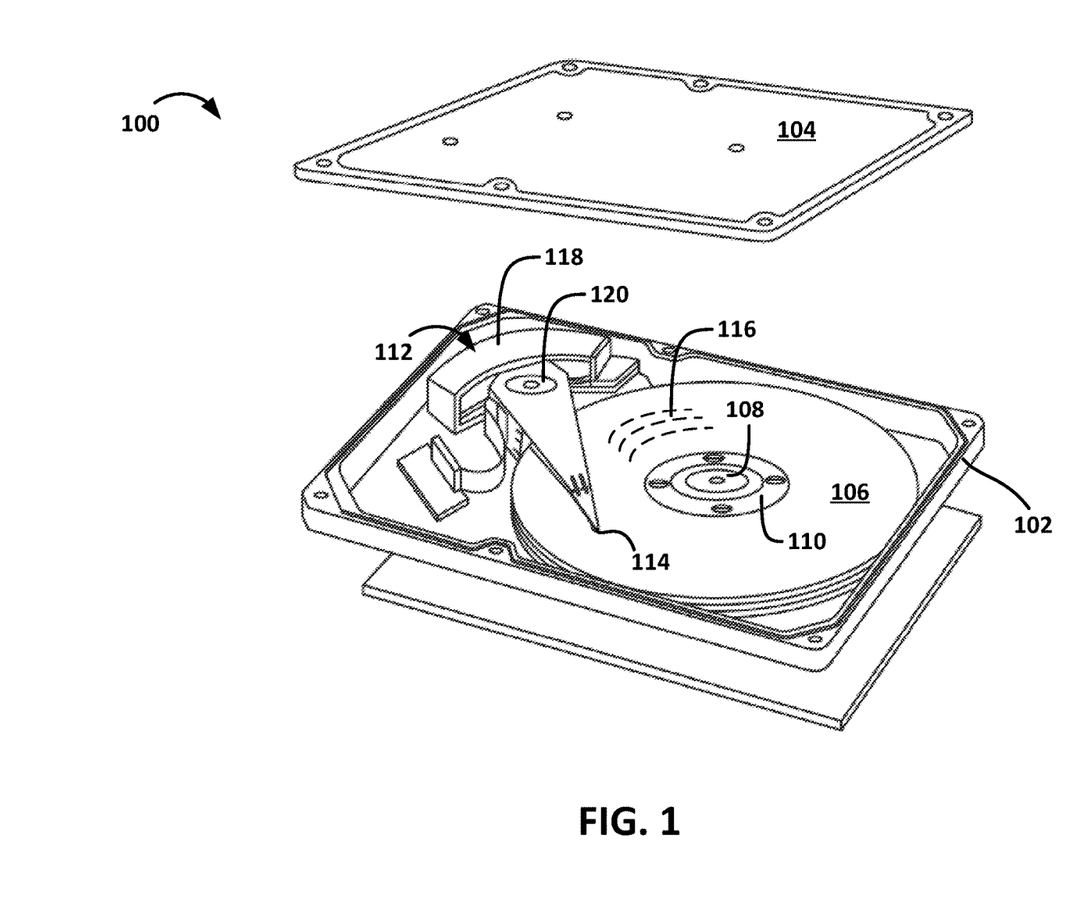
FIG. 1 shows an exploded view of a hard disk drive, in accordance with certain embodiments of the present disclosure.

FIG. 1 shows an exploded, perspective view of a hard disk drive 100 having a base deck 102 and top cover 104 that house various components of the hard disk drive 100. The hard disk drive 100 includes magnetic recording media 106 (individually referred to as a magnetic recording medium) coupled to a spindle motor 108 by a disk clamp 110. The hard disk drive 100 also includes an actuator assembly 112 that positions read/write heads 114 over data tracks 116 on the magnetic recording media 106. During operation, the spindle motor 108 rotates the magnetic recording media 106 while the actuator assembly 112 positions the read/write heads 114. The actuator assembly 112 is driven by a voice coil motor assembly 118 to pivot around a pivot bearing 120.

Spindle motors 108 in current hard disk drives utilize fluid dynamic bearings and are designed and used for particular advertised rated speeds (e.g., a predetermined rated speed). For example, spindle motors in hard disk drives typically operate at speeds around advertised rated speeds such as 5,400 revolutions per minute (rpm); 7,200 rpm; 10,000 rpm; or 15,000 rpm. The specific actual operating speeds of the motors may vary somewhat from the advertised rated speeds but are typically within a few hundred rpms of the advertised rated speed. For example, a 10,000 rpm motor may actually operate at or around 10,500 rpm in a hard disk drive. In another example, a 7,200 rpm motor may actually operate at or around 7,250 rpm in a hard disk drive. As such, the rated speeds may not be the exact same as the actual operating speeds of spindle motors in hard disk drives. The rated speed (and therefore the associated actual operating speed) for a given spindle motor design is dependent on features such as the number of stator windings, the size of fluid bearings, and various dimensions of the spindle motor 108.

The read/write heads 114 write data to the magnetic recording media 106 by generating and emitting a magnetic field towards the magnetic recording media 106 which induces magnetically polarized transitions on the desired data track 116. The magnetically polarized transitions are representative of the data. The read/write heads 114 sense (or "read") the magnetically polarized transitions with a magnetic transducer. As the magnetic recording media 106 rotates adjacent the magnetic transducer, the magnetically polarized transitions induce a varying magnetic field into the magnetic transducer. The magnetic transducer converts the varying magnetic field into a read signal that is delivered to a preamplifier and then to a read channel for processing. The read channel converts the read signal into a digital signal that is processed and then provided to a host system (e.g., server, laptop computer, desktop computer).

During manufacture of hard disk drives 100, magnetic recording media 106 are subjected to tests that scan for potential flaws that would likely cause errors when writing data to or reading data from the magnetic recording media 106. These tests are sometimes referred to as flaw scan tests. Flaw scan tests can be performed while the hard disk drives 100 are positioned in a testing system (described in more detail with respect to FIG. 6) that houses and simultaneously tests hundreds of hard disk drives 100. Example flaws identified during flaw scan tests include physical divots (e.g., scratches) or material buildup along the surfaces of the magnetic recording media 106. These flaws make it difficult to write data to or read data from affected areas of the magnetic recording media 106 and/or can damage to the read/write heads 114.

Typically, a flaw scan test involves writing test patterns to each of the data tracks 116 (e.g., by writing to data tracks sequentially) and then reading the test patterns sequentially from each of the data tracks 116 using a read/write head 114. An example test pattern is a square wave pattern with a particular duty cycle. The read signal generated by the read/write head 114 in response to reading such a test pattern is a sinusoidal-like read signal. Errors in the read signal, which are identified during an analysis of the read signal, indicate flaws in the magnetic recording media 106. For example, a read signal generated by the read/write head 114 may include disruptions (e.g., less-than-expected amplitude, spikes in amplitude) indicative of flaws. In another example, as the read channel converts the read signal into a digital signal, the read channel may identify errors indicative of flaws within particular data tracks. Areas of the magnetic recording media 106 identified as containing flaws (and the location of such areas) are recorded in a flaw map. Flaw maps are referred to during operation of the hard disk drive 100 so that data is not written to the areas mapped as containing flaws.

As discussed above, as more data tracks are used in a given area of a magnetic recording medium 106 (so that more user data can be stored in that area), flaw scan tests take longer to complete, which increases the time and cost to manufacture hard disk drives 100. Certain embodiments of the present disclosure are accordingly directed to techniques for decreasing the time required to perform flaw scan tests.

Figure 2:
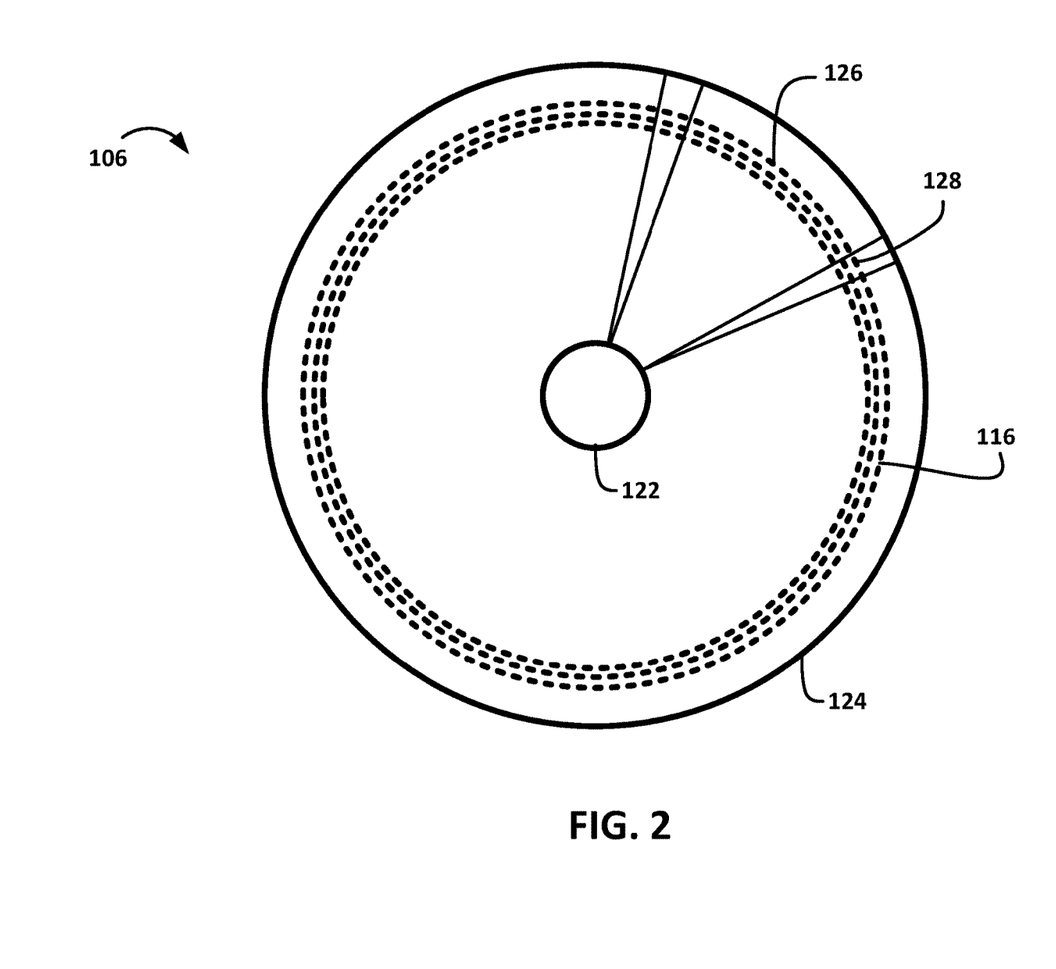
FIG. 2 shows a top view of a magnetic recording medium, in accordance with certain embodiments of the present disclosure.

FIG. 2 shows a top view of a magnetic recording medium 106. The magnetic recording medium 106 is donut-shaped and includes an inner boundary 122, which is to be coupled to a spindle motor, and an outer boundary 124. The magnetic recording medium 106 includes data tracks 116 for data storage between the inner boundary 122 and the outer boundary 124. For simplicity, only a few data tracks 116 are shown in FIG. 2. Each of the data tracks 116 includes data sectors 126 (sometimes referred to as data wedges) for storing user data and includes servo sectors 128 (sometimes referred to as servo wedges) for storing servo information. Servo information facilitates the read/write head 114 seeking and following data tracks 116 on the magnetic recording media 106.

Figure 3:
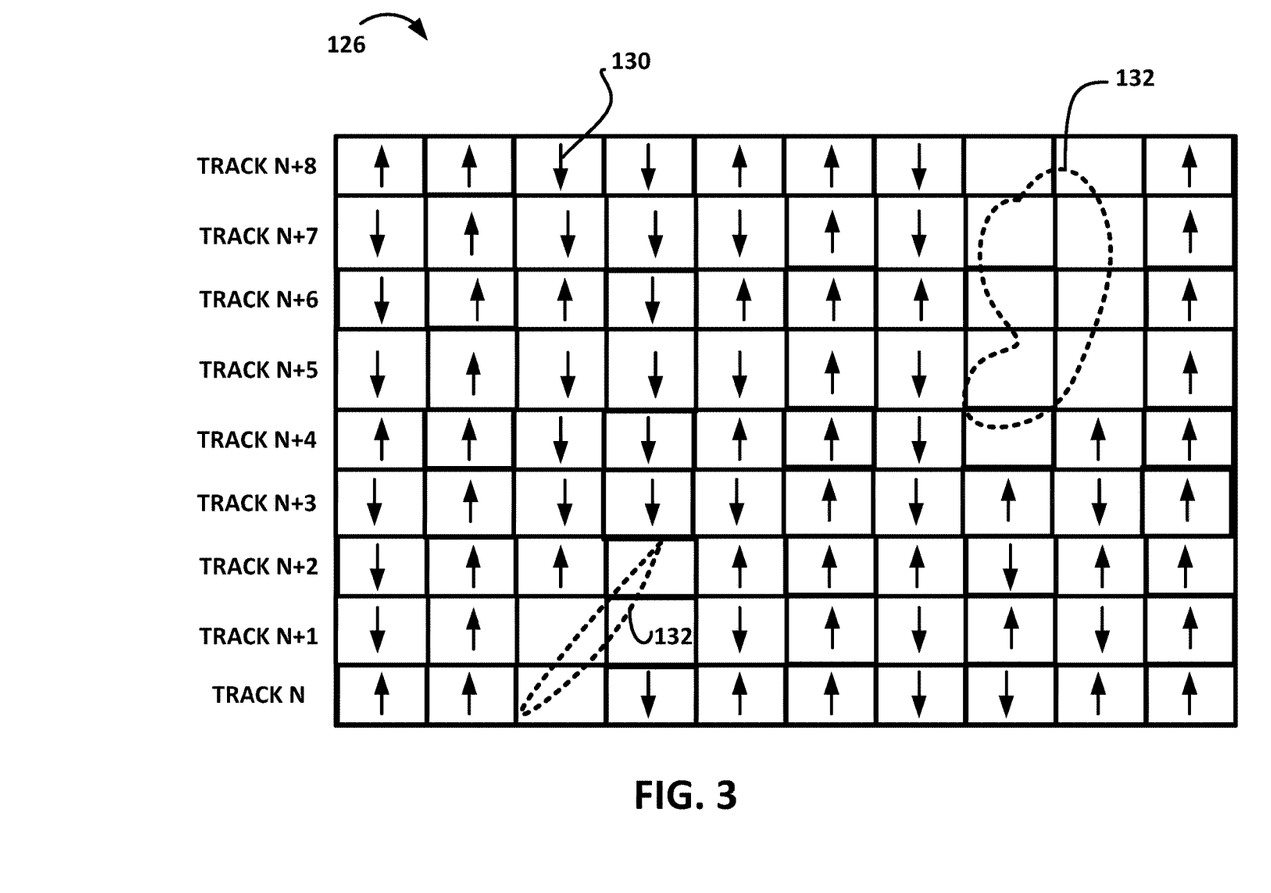
FIG. 3 shows a schematic of data tracks of the magnetic recording medium of FIG. 2, in accordance with certain embodiments of the present disclosure.
Figure 4:
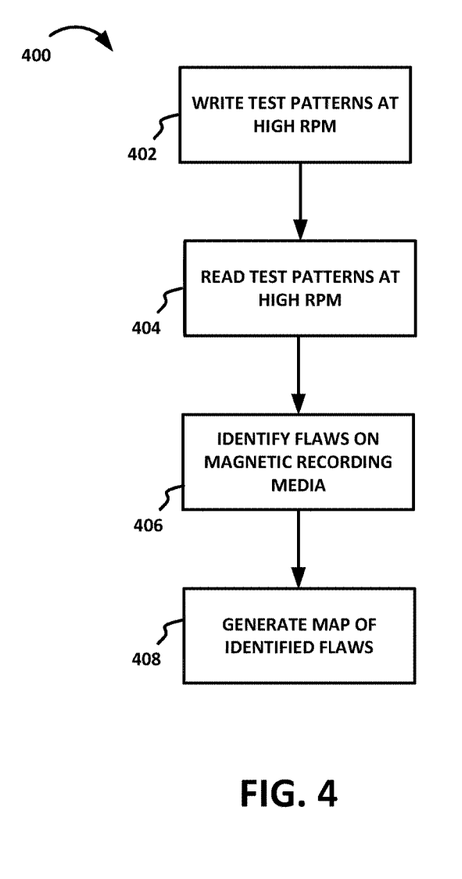
FIG. 4 shows a block representation of steps in methods for scanning for flaws on magnetic recording media, in accordance with certain embodiments of the present disclosure.

FIG. 3 shows example data sectors 126 of nine data tracks (i.e., track N through track N+8) of the magnetic recording medium 106. FIG. 4 shows a block representation of steps in a method 400 for scanning for flaws on the magnetic recording medium 106.

The data tracks include magnetically polarized transitions 130, which are represented by arrows within the data tracks. These magnetic transitions represent a test pattern that has been written to the data tracks. Typically, the magnetic transitions are written to the data tracks while the hard disk drive's spindle motor 108 is rotated at the intended operating speed (e.g., the actual operating speed associated with the rated speed). For example, if the hard disk drive is rated for 10,000 rpm, the spindle motor 108 may be rotated at a speed within 1,000 rpm of 10,000 rpm (e.g., 10,000 rpm±1000 rpm) while the test patterns are written to data tracks. After writing the test patterns, the test patterns can be read by a read/write head 114 while the spindle motor 108 is rotated at the intended operating speed. The read/write head 114 generates a read signal that is converted to a digital read signal by a read channel. In certain embodiments, the generated read signal is a sinusoidal-like signal.

In certain embodiments of the present disclosure, the magnetic transitions (e.g., the test patterns) are written to the data tracks while the spindle motor 108 is operated at a speed greater than the actual speed at which the hard disk drive operates at after manufacture (block 402 in FIG. 4). In an example, during all or portions of the flaw scan test, a spindle motor in hard disk drive rated to operate around 7,200 rpm may be rotated at 10,500 rpm. In certain embodiments, the speed at which the spindle rotates during the flaw scan test is 1,000 rpm greater than the actual operating speed and/or the rated speed of the spindle motor. In certain embodiments, the speed at which the spindle rotates during the flaw scan test is 1,000 to 5,000 rpm greater than the actual operating speed and/or the rated speed of the spindle motor. In certain embodiments, during the flaw scan test, the spindle motor 108 of the hard disk drive 100 is rotated at a higher speed than the speed used during other manufacturing tests. For example, before and after the flaw scan test, the hard disk drive 100 is subjected to a variety of tests and processes that establish fly-height parameters, establish read/write channel parameters, and tune write power parameters during manufacture. During these tests and processes, the spindle motor 108 is rotated at the actual operating speed of the hard disk drive 100.

After writing the test patterns to tracks of the magnetic recording media 106, the read/write heads 114 can read the test patterns while the spindle motor 108 is operated at a speed greater than the actual speed at which the hard disk drive operates at after manufacture (step 404 in FIG. 4). For example, the higher speed used while reading the test patterns may be substantially the same speed used while writing the test patterns. In certain embodiments, the speed used while reading is different than the speed used during writing. In certain embodiments, the higher speed was used during only one of writing and reading the test patterns.

Performing the flaw scan test (or portions of the flaw scan test) while rotating the spindle motor 108 (and therefore magnetic recording media 106) at a higher speed decreases the time required to complete the flaw scan test, which saves manufacturing time.

Accomplishing these higher speeds may involve modifying various hard disk drive parameters (e.g., servo parameters, channel parameters, fly height parameters) to accommodate for the fact that the magnetic transitions (e.g., test patterns, servo patterns) are being read at a higher frequency than the hard disk drive 100 is designed for. In general, timing parameters associated with a fixed time-based parameter may be scaled for higher speed flaw scan while other symbol- or bit-based parameters will automatically scale for the higher speed flaw scan. Example servo parameters to be adjusted (e.g., scaled) include the timing or indexing between servo sectors used during track seeking and track following operations. In another example, channel parameters such as FIR coefficients can be adjusted to accommodate for higher data rates associated with the higher speeds. Adjusting channel parameters may involve running a channel optimization test while the spindle motor is operated at the higher speed to determine the adjusted channel parameters. In another example, the height between the read/write heads 114 and the magnetic recording media 106 is increased for flaw scan tests operated at higher spindle motor speeds.

After reading the test patterns, the flaws 132 on the magnetic recording medium 106 can be identified (step 406 in FIG. 4). Flaws are identified by analyzing the read signal. For example, a read signal generated by the read/write head 114 may include disruptions indicative of flaws or, as the read channel converts the read signal into a digital signal, the read channel may identify errors indicative of flaws within particular data tracks. FIG. 3 shows a few examples of flaws 132 at locations where no magnetically polarized transitions 130 were recorded. The lack of magnetically polarized transitions 130 at locations expected to have transitions may be the result of a physical divot (e.g., scratch) along the surface of the magnetic recording medium 106. The lack of magnetically polarized transitions 130 may be detected when analyzing the read signal, and a flaw may be identified to exist at such locations in response to detecting the lack of magnetically polarized transitions 130.

As flaws are identified, the size and location of the identified flaws can be recorded (e.g., mapped) (step 408 in FIG. 4). For example, upon identifying a flaw, a range of angles and radii on the magnetic recording medium 106 associated with the identified flaw can be recorded. The identified flaws are recorded to what may be referred to as a flaw map. The flaw map is a list of identified flaws and their size and location on the magnetic recording media 106.

In certain embodiments, the size of the identified flaws is padded such that areas around the identified flaws are recorded to the flaw map. For example, in FIG. 3, the size of the flaw 132 that extends along tracks N through N+2 may be padded such that in the flaw map identifies the flaw 132 as covering more than just tracks N through N+2. The flaw map is stored to memory (e.g., firmware) within hard disk drives 100 and used during operation of the hard disk drives 100 so that data is not written to the areas mapped as containing flaws.

Figure 5:
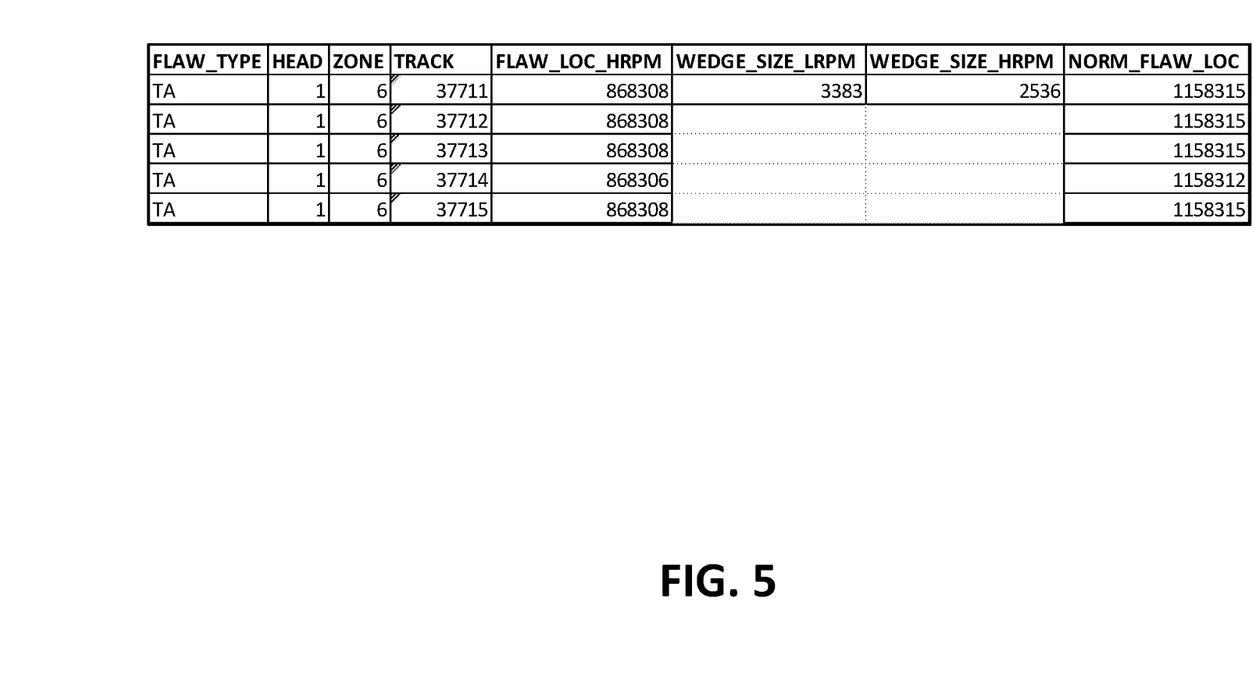
FIG. 5 shows a table listing flaw scan locations, in accordance with certain embodiments of the present disclosure.

In certain embodiments, before completing the flaw map, the location of the flaw is normalized for the predetermined rated speed of the spindle motor. For example, the flaw location identified during the higher rpm flaw test may be normalized to a location for the predetermined rated speed before being stored to memory. FIG. 5 shows a table of identified flaws, and Equation 1 below shows how certain values in the table can be used to calculate a normalized flaw location. The first column in the table in FIG. 5 indicates the type of flaw, where "TA" indicates a thermal asperity. The second column indicates which read/write head 114 was used while identifying the flaws (or surface of a magnetic recording medium 106 that contains the identified flaws). The third column indicates the zone of the magnetic recording medium 106 containing the identified flaw, and the fourth column indicates the data track with the identified flaw. The fifth column indicates the location of the identified flaw within the data track as identified while operating the spindle motor at an rpm higher than the actual operating speed and/or the rated speed of the spindle motor. The sixth and seventh columns include the wedge sizes during the actual operating speed and/or the rated speed of the spindle motor and the higher rpm, respectively. The last column is the normalized location (e.g., the location at the lower rpm) of the identified flaw within the data track. In one example, the normalized flaw location is calculated using Equation 1 below. The various components in the equation are shown in the table in FIG. 5.

$$\text{FLAW\_LOC}_{NORM} = \frac{\text{FLAW\_LOC}_{HRPM} \times \text{WEDGE\_SIZE}_{LRPM}}{\text{WEDGE\_SIZE}_{HRPM}} \quad \text{Equation 1}$$

After or while identifying the flaws, the number of flaws and/or total areas consumed by flaws can be compared to various thresholds to determine whether the hard disk drive 100 should be reworked or whether the hard disk drive 100 should be graded for a different storage capacity. For example, if the number of flaws or total area containing flaws on a surface of the magnetic recording media 106 exceeds a maximum threshold of acceptable flaws or area, then the hard disk drive 100 may be designated as "to be reworked," in which the flawed magnetic recording media 106 is replaced with new magnetic recording media 106 and the hard disk drive 100 repeats certain processing and testing steps. In another example, the number of flaws or total area containing flaws on a surface of the magnetic recording media 106 may not exceed a maximum threshold of acceptable flaws or area but instead may cause the hard disk drive 100 to be downgraded to a lower capacity than initially intended.

Figure 6:
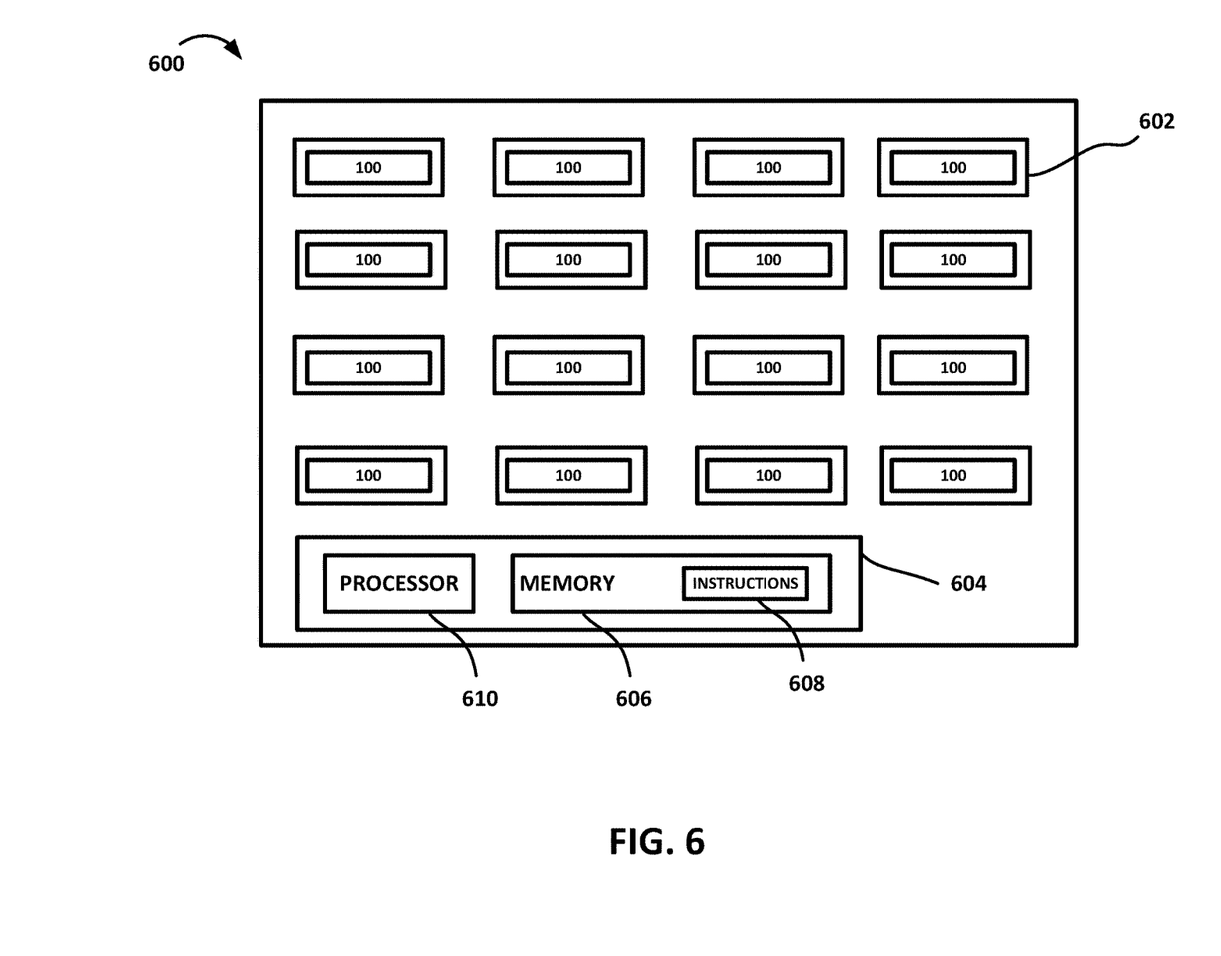
FIG. 6 shows a schematic of a testing machine, in accordance with certain embodiments of the present disclosure.

FIG. 6 shows a testing system 600 that includes a plurality of testing slots 602. The testing slots 602 may be sized such that a hard disk drive 100 can be positioned in each of the testing slots 602. While the hard disk drives 100 are positioned in the testing slots 602, the testing system 600 can subject the hard disk drives 100 to the flaw scan tests described above. For example, the testing system 600 can include components that assist with carrying out the above-described flaw scan tests. The testing system 600 can include one or more controllers 604 implemented using firmware, integrated circuits, and/or software modules that interact with each other or are combined together. For example, the controllers 604 may include memory 606 storing computer-readable instructions/code 608 for execution by one or more processors 610 (e.g., microprocessor)—and therefore the testing system 600—to perform aspects of the methods discussed herein. The computer-executable instructions 608 may include, for example, computer code, machine-useable instructions, and the like such as, for example, program components capable of being executed by the one or more processors 610.

Besides the above-described flaw scan tests, other tests used while manufacturing hard disk drives can take advantage of using higher rpm speeds to decrease overall test times. For example, when establishing servo-related parameters, the spindle motor 108 can be operated at a higher rpm than the actual operating speed associated with the advertised rated speed.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method for testing a hard disk drive, which includes a motor set to rotate at a predetermined rated speed, the method comprising:
    subjecting the hard disk drive to a plurality of tests during which the motor operates at a first speed, the first speed being the predetermined rated speed; and
    subjecting the hard disk drive to a high-rpm test during at least a portion of which the motor operates at a second speed greater than the predetermined rated speed.

2. The method of claim 1, wherein the second speed is 1,000 rpm greater than than the predetermined rated speed.

3. The method of claim 1, wherein the second speed is 1,000 rpm to 5,000 rpm greater than the predetermined rated speed.

4. The method of claim 1, wherein the predetermined rated speed is one of 5,400; 7,200; 10,000; and 15,000 revolutions per minute.

5. The method of claim 1, wherein the high-rpm test is a flaw scan test.

6. The method of claim 5, wherein the flaw scan test comprises:
    writing a test pattern to data tracks of a magnetic recording medium while the motor operates at the second speed.

7. The method of claim 5, wherein the flaw scan test comprises:
    reading a test pattern from data tracks of a magnetic recording medium while the motor operates at the second speed.

8. The method of claim 7, wherein the flaw scan test further comprises:
    identifying flaws within the data tracks in response to reading the test pattern while the motor operates at the second speed.

9. The method of claim 8, further comprising:
    generating a map of the identified flaws of the magnetic recording medium.

10. The method of claim 9, wherein generating the map includes determining a size and location of the identified flaws.

11. The method of claim 9, further comprising:
    storing the map to memory of the hard disk drive.

12. The method of claim 9, wherein generating the map includes normalizing a location of the identified flaws based on the predetermined rated speed.

13. The method of claim 1, wherein the high-rpm test establishes servo parameters.

14. A method for performing a flaw scan test on a hard disk drive, which includes a magnetic recording medium and spindle motor associated with a predetermined rated speed, the method comprising:
    writing a test pattern to the magnetic recording medium while operating the spindle motor at a speed greater than the predetermined rated speed;
    reading the test pattern at the greater speed; and
    detecting flaws in response to reading the test pattern.

15. The method of claim 14, wherein the greater speed is 1,000 rpm to 5,000 rpm greater than the predetermined rated speed.

16. A testing system for scanning for flaws on magnetic recording media of hard disk drives, each hard disk drive having a spindle motor set to rotate at a predetermined rated speed, the testing system comprising:
    a plurality of testing slots for receiving the hard disk drives; and
    a controller configured to cause the testing system to implement a routine of:
        operating the spindle motor of at least some of the hard disk drives in the plurality of testing slots at the predetermined rated speed during a plurality of tests, and
        operating the spindle motor of at least some hard disk drives in the plurality of testing slots at a speed greater than the predetermined rated speed during a flaw scan test.

17. The testing system of claim 16, wherein the flaw scan test includes:
    writing a test pattern to the magnetic recording media,
    reading the test pattern, and
    detecting flaws in response to reading the test pattern.

18. The testing system of claim 17, wherein the controller is configured to cause the testing system to implement a routine of generating a map of the detected flaws of the magnetic recording medium.

19. The testing system of claim 18, wherein the map includes a location of each of the detected flaws.

20. The testing system of claim 18, wherein the controller is configured to cause the testing system to implement a routine of storing the generated map to firmware in each of the hard disk drives.

* * * * *

UNITED STATES PATENT AND TRADEMARK OFFICE
CERTIFICATE OF CORRECTION

PATENT NO. : 10,290,319 B1
APPLICATION NO. : 16/058819
DATED : May 14, 2019
INVENTOR(S) : Antonia Tsoukatos et al.

Page 1 of 1

It is certified that error appears in the above-identified patent and that said Letters Patent is hereby corrected as shown below:

In the Claims

Column 7, Line 33:
Claim 2:
Delete the second occurrence of the word "than"

Signed and Sealed this
Twenty-sixth Day of November, 2019

Andrei Iancu
*Director of the United States Patent and Trademark Office*